US006338090B1

(12) United States Patent
Emmes et al.

(10) Patent No.: US 6,338,090 B1
(45) Date of Patent: Jan. 8, 2002

(54) METHOD AND APPARATUS FOR SELECTIVELY USING INPUT/OUTPUT BUFFERS AS A RETRANSMIT VEHICLE IN AN INFORMATION HANDLING SYSTEM

(75) Inventors: David B. Emmes, Poughkeepsie; Donald W. Schmidt, Stone Ridge, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/049,436

(22) Filed: Mar. 27, 1998

(51) Int. Cl.[7] .................... G06F 15/16; G06F 15/177
(52) U.S. Cl. ..................... 709/234; 710/55; 710/56
(58) Field of Search ................ 395/182.16, 375, 395/868, 325; 709/234, 200, 238, 239, 235, 232, 229, 223, 224; 370/60, 13, 97, 94.1, 468, 322, 473, 402, 453, 428; 371/33; 340/172.5; 710/52–57, 112, 100, 129; 714/749

(56) References Cited

U.S. PATENT DOCUMENTS

| 3,772,653 | A | * | 11/1973 | Brown | 340/172.5 |
|---|---|---|---|---|---|
| 4,672,570 | A | | 6/1987 | Benken | 364/900 |
| 4,701,911 | A | * | 10/1987 | Ulug | 370/453 |
| 4,807,224 | A | | 2/1989 | Naron et al. | 370/94 |
| 5,113,394 | A | * | 5/1992 | Kotzin | 370/97 |
| 5,189,672 | A | * | 2/1993 | LeBihan | 370/94.1 |
| 5,255,268 | A | | 10/1993 | Cato et al. | 370/94.1 |
| 5,359,715 | A | * | 10/1994 | Heil et al. | 395/325 |
| 5,394,526 | A | | 2/1995 | Crouse et al. | 395/200 |
| 5,410,536 | A | * | 4/1995 | Shah et al. | 370/13 |
| 5,432,909 | A | * | 7/1995 | Cok | 709/200 |
| 5,459,725 | A | * | 10/1995 | Bodener et al. | 370/60 |

(List continued on next page.)

FOREIGN PATENT DOCUMENTS

| JP | 06069957 | 3/1994 |
|---|---|---|
| JP | 07271722 A | 10/1995 |

OTHER PUBLICATIONS

Danzig, Flow Control for Limited Buffer Multicast, IEEE 1994.*
IBM Technical Discl. Bulletin, vol. 37, No. 02B– 2/94 "Transport Application Programming Interface Extension for Multimedia" pp. 11–13.

*Primary Examiner*—Mark H. Rinehart
*Assistant Examiner*—Thong Vu
(74) *Attorney, Agent, or Firm*—William A. Kinnaman, Jr.

(57) ABSTRACT

A method and apparatus for selectively using input/output (I/O) buffers as a retransmit vehicle in a client/server system. The decision whether to use an I/O buffer as a retransmit vehicle is based on a number of factors, including the packet size, the expected round-trip time (RTT) for an acknowledgment of the transmission, the number of I/O buffers currently allocated, and the number of I/O buffers remaining. If the decision is made not to use the I/O buffer as a retransmit vehicle, then the data is copied into a send buffer that is maintained by the system for the particular requester. Initially three threshold values, the round-trip time (RTT) threshold, the critical threshold, and the tight buffer threshold, are set. Connections having a longer round-trip time than a set round-trip time threshold or connections made when the number of I/O buffers remaining is below the critical threshold are not allowed to keep the I/O buffer as a retransmission vehicle. If the number of I/O buffers remaining falls below the critical threshold, a critical stabilization interval is started. During a critical stabilization interval, the I/O buffers may not be used as a retransmit vehicle if the number of I/O buffers already allocated exceeds the tight buffer threshold, even if the number of I/O buffers remaining is above the critical threshold. For each I/O buffer, a use count is maintained of the number of packets in the buffer awaiting acknowledgment. The use count is decremented each time an acknowledgment is received for one of the packets in the I/O buffer. When the use count has been decremented to zero, the I/O buffer is freed.

20 Claims, 12 Drawing Sheets

U.S. PATENT DOCUMENTS

| | | | |
|---|---|---|---|
| 5,546,546 A | * | 8/1996 | Bell et al. .................... 710/112 |
| 5,548,735 A | * | 8/1996 | Chen et al. ................. 395/375 |
| 5,561,824 A | * | 10/1996 | Carreiro et al. ............... 710/52 |
| 5,563,874 A | * | 10/1996 | Kant ........................... 370/13 |
| 5,604,866 A | * | 2/1997 | Kolb et al. ................. 709/234 |
| 5,659,687 A | | 8/1997 | Kim et al. .................. 395/292 |
| 5,659,794 A | | 8/1997 | Caldarale et al. ........... 395/821 |
| 5,664,116 A | | 9/1997 | Gayton et al. .............. 395/200 |
| 5,684,797 A | | 11/1997 | Aznar et al. ................ 370/390 |
| 5,701,427 A | | 12/1997 | Lathrop ...................... 395/200 |
| 5,774,479 A | * | 6/1998 | Lee et al. ...................... 371/33 |
| 5,894,583 A | * | 4/1999 | Johnson et al. ............. 395/868 |
| 5,918,002 A | * | 6/1999 | Klemets et al. ........ 395/182.16 |
| 5,930,261 A | * | 7/1999 | Shemla et al. .............. 370/428 |
| 5,931,915 A | * | 8/1999 | Benner et al. .............. 709/232 |
| 6,052,385 A | * | 4/2000 | Kanerva et al. ............ 370/468 |
| 6,092,141 A | * | 7/2000 | Lange ........................ 710/129 |
| 6,240,473 B1 | * | 5/2001 | Houg ......................... 710/100 |

\* cited by examiner

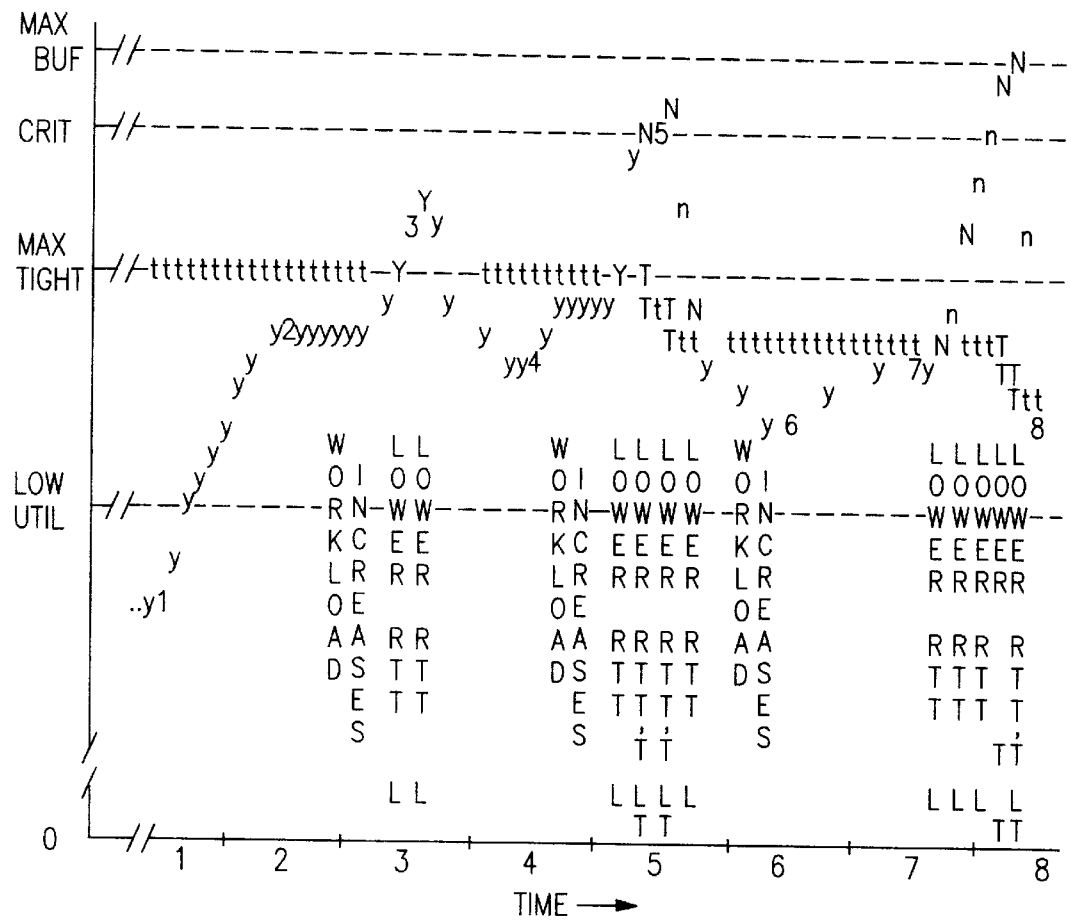

SCENARIO TO SHOW DYNAMICS OF BUFFER COUNT AND THRESHOLD ADJUSTMENTS n=NUMBER OF BUFFERS CREATED, NOT ALLOWED TO BE KEPT
N=NUMBER OF BUFFERS CREATED WHEN ACTION WAS TAKEN, NOT ALLOWED TO BE KEPT
y=NUMBER OF BUFFERS CREATED, ALLOWED TO BE KEPT IF REQUESTED
Y=NUMBER OF BUFFERS CREATED WHEN AN ACTION WAS TAKEN, ALLOWED TO BE KEPT
  IF REQUESTED
t=TIGHT BUFFER THRESHOLD
T=TIGHT BUFFER THRESHOLD LOWERED AS A RESULT OF BUFFER ALLOCATION

L=ROUND-TRIP TIME THRESHOLD LOWERED

RTT=ROUND-TRIP TIME THRESHOLD

FIG.7

METHOD AND APPARATUS FOR SELECTIVELY USING INPUT/OUTPUT BUFFERS AS A RETRANSMIT VEHICLE IN AN INFORMATION HANDLING SYSTEM

CROSS-REFERENCE TO RELATED APPLICATION

This application is related to the commonly owned, concurrently filed application of the same inventors, Ser. No. 69/049,513, entitled "Method and Apparatus for Adaptively Blocking Outgoing Communication Requests in an Information Handling System" incorporated herein by reference.

BACKGROUND OF THE INVENTION

1. Field of the Invention

This invention relates to a method and apparatus for selectively using input/output (I/O) buffers as a retransmit vehicle in an information handling system and, more particularly, to a method and apparatus for selectively using such buffers in a client/server system in which a plurality of requesters are operating concurrently.

2. Description of the Related Art

In acknowledgment-based communication protocols, such as TCP/IP, there is a requirement to keep a copy of the user's data which is sent to a partner until an acknowledgment arrives indicating that the data has been received. If such an acknowledgment does not arrive in timely fashion, the user data must be retransmitted. Such retransmission recurs until either the desired acknowledgment arrives or a threshold number of retransmissions occurs. In TCP/IP the interval between retransmissions is not allowed to be smaller than one second, nor larger than 60 seconds and may increase as the number of retransmissions increases. Upon reaching the threshold number of retransmissions, a TCP/IP connection is dropped. Note that after the user makes a request to send the data, control is normally returned to the user. It is not permissible to suspend the user until the acknowledgment arrives, since the user may have further processing to perform and cannot be delayed. Once the user regains control, the user is free to modify the contents of the data area or to free the area which contained the data that was sent. Thus, it is not possible to merely remember where the user data resides and reaccess it for retransmission.

The standard approach to this problem is to make a copy of the user data prior to returning to the user. On many machines, such a copy may be quite expensive, depending on how much data is being copied, whether the source and/or target areas are in processor cache, the size of the processor cache and so forth. In general, large data copies are disruptive to good system performance and costly in machine cycles.

An alternative approach has been to change applications to obtain the I/O buffers beforehand and put the data directly there. When this can be done, there are no data copies. This alternative approach reduces portability and forces the application to manage system resources. This generally requires some sort of authorization, which is undesirable, from both an installation and an application developer point of view.

SUMMARY OF THE INVENTION

It is common for implementations of communications protocols to pre-allocate a set of I/O buffers so as to avoid this setup overhead in "real time" during an actual user request. The number of buffers allocated during initialization may well be less than the maximum number allowed in order to save physical storage. For ease of implementation, these I/O buffers are allocated in one or a few distinct sizes. For efficiency in using the channel subsystem, media and supporting software, requests from multiple users may occupy a single I/O buffer.

The solution involves using the I/O buffer as the retransmission vehicle and providing a control procedure to decide when a particular request merits this usage. If the request does not merit maintaining the I/O buffer in this way, then a copy of the user data is made into a system-maintained buffer (which can be pageable). To support multiple concurrent use of a single I/O buffer as a retransmission vehicle, a buffer-related use count is maintained. Furthermore the I/O buffer is not freed until acknowledgments arrive for all uses which depend on the I/O buffer copy of the data for retransmission.

From a system resource point of view it is undesirable to keep an entire I/O buffer tied up for relatively small amounts of data. Furthermore the cost of copying small amounts of data is minor, probably no worse than the overhead of managing and tracking the I/O buffer usage itself Toward this end, an implementation-specific threshold for the amount of data required to keep the I/O buffer is chosen based on the I/O buffer size and the relative cost of copying data.

It is also undesirable to tie up the I/O buffer for long periods of time, since the number of I/O buffers is typically constrained by some external limit. Even without such an external limit, the I/O buffers represent a special resource since they are not available to the system for other usage, nor can the physical storage be reassigned for other purposes. In the absence of some external limit, there will be some internal limit to prevent consuming all available storage for I/O buffers.

If the system runs out of I/O buffers and a new request to send data arrives, then the request must either be suspended or refused. The former approach violates the principle that the user not be delayed (and is more complex), so it cannot be used. The latter approach implies that some sort of redrive mechanism must exist and the user data must be copied to a system managed buffer. As the redrive mechanism represents a delay and additional system overhead, it is undesirable to run out of buffers. This is true even when this procedure is not in place or when no requests are using I/O buffers as a retransmission vehicle, so that an adequate number of I/O buffers must be allowed. This procedure maximizes the use of I/O buffers within the limits established to decrease the effective instruction pathlength.

Thus it is desirable to have some insight into how long it will take before the expected acknowledgment should arrive so that the I/O buffer is not tied down for a given request. In protocols such as TCP/IP there is a measured average round-trip time (RTT) which can be used as an indication of the expected usage time for the I/O buffer for a given request, as this represents the time to receive the acknowledgment once the data is sent.

When retransmission occurs it is assumed to be due to problems in the network or possibly on the remote host (it could also be due to problems locally, but this is not material). While retransmission could be done from the I/O buffer if the data is maintained there, it is uncertain how much longer it will take to get an acknowledgment which is already tardy. Therefore, in the solution described here, retransmission causes the system to copy the data to be retransmitted from the I/O buffer (if present) to a system managed buffer. A simple timer mechanism can be used with this same purpose if the retransmission mechanism is too lax

BRIEF DESCRIPTION OF THE DRAWINGS

FIG. 7 is a time line showing how the quantities being controlled vary over time.

DESCRIPTION OF THE PREFERRED EMBODIMENT

Figure 1:
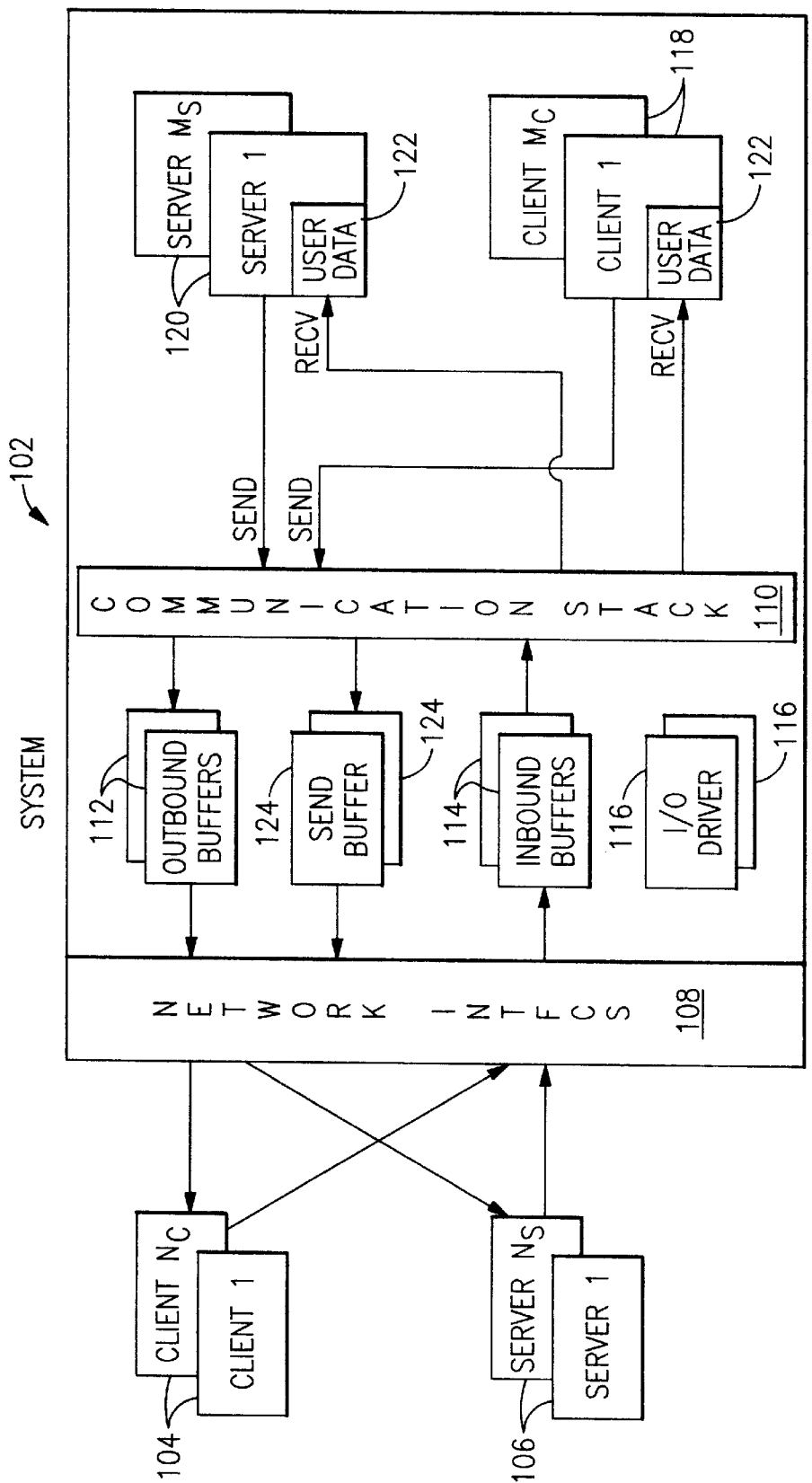
FIG. 1 shows a typical system configuration incorporating the present invention.

FIG. 1 shows a typical configuration 100 in which the present invention may be used. In the configuration 100, a first computer system 102 (the "local" system) communicates with one or more remote client systems 104 (clients $1-N_c$) and one or more remote server systems 106 (servers $1-N_s$) via one or more communications channels (not separately shown) of any suitable type, such as local area networks (LANs), point-to-point connections or the like.

Local system 102 may contain server functions servicing remote client systems 104 as well as client functions serviced by remote servers 106, although the particular allocation of client functions and server functions among systems 102, 104 and 106 forms no part of the present invention. Local system 102 is referred to as such because it is assumed to be transmitting data to remote systems 104 and 106 and is therefore the system of interest in explaining the present invention. In an actual configuration, remote systems 104 and 106 may be similarly equipped for when they assume transmitting roles. Local system 102 has the usual components of a programmed general-purpose computer system (as do remote systems 104 and 106), including a central processing unit (CPU), main and peripheral storage, and an operating system (OS) kernel (not separately shown). In the embodiment shown, local system 102 comprises an IBM S/390™ server such as an S/390 Parallel Enterprise Server™ G3 or G4, while the OS kernel comprises the IBM OS/390™ operating system. However, the invention is not limited to any particular platform.

Local system 102 also contains one or more network adapters or interfaces 108 coupling the system to remote systems 104 and 106. A communication stack 1 10 (e.g., a TCP/IP stack) of the OS kernel interacts with each network interface via one or more outbound buffers 112 and one or more inbound buffers 114 (I/O buffers collectively). Buffers 112 and 114 physically reside in main storage and are allocated from available storage, as described below. Associated with each network interface 108 is an I/O driver 1116, a software component that handles the transfer of data between the network interface and the associated I/O buffers 112 and 114. Thus, on outbound transfers, communication stack 110 fills one or more outbound buffers 112 and then calls an I/O driver 116 to transfer the data from the outbound buffers 112 to the network interface 108. Similarly, on inbound transfers, an I/O interrupt causes an I/O driver 116 to give control to the communication stack 110 to process the inbound data within an inbound buffer 114. A suitable channel program (not separately shown) constructed by the I/O driver 116 transfers data from the network interface 108 into the inbound buffer 114, transparently to the system.

Communication stack 110 receives communication requests from one or more local client requesters 118 (clients $1-M_c$) and/or server requesters 120 (servers $1-M_s$) that issue the requests to the OS kernel 110. Requesters 118 and 120 may be different processes (either different applications or multiple instances of the same application), different threads of the same process, or a combination of both. Each requester 118 or 120 has a user data area 122 in its own address space that it uses to construct outgoing messages or to store incoming messages. Communication stack 110 responds to a communication request (e.g., a send request) from a requester 118 or 120 by constructing one or more packets in outbound buffers 112 from data in the user data area 122 of the requester. When it has amassed a sufficient number of packets, communication stack 110 calls the I/O driver 116 to transfer a block of such packets to the network interface, as described more fully in the related application referred to above, incorporated herein by reference.

In addition to I/O buffers 112 and 114, system 102 also has a send buffer 124 for each requester 118 or 120 that is managed by the communication stack 110. The present invention minimizes use of the send buffers 124 and the attendant overhead by using the outbound I/O buffers 112 as the default retransmission vehicle and using send buffers 120 only when necessary or conducive to optimal performance.

The following paragraphs describe in general terms the procedure of the present invention for deciding whether to keep the I/O buffers 112 as a retransmission vehicle. Following this general discussion, a specific software implementation for the system 102 shown in FIG. 1 will be described.

In this description, it is assumed that there is a limit on the maximum number of I/O buffers 112 which are allowed to be created, though this limit may be changed from time to time. This limit may be a system external or an internally generated value (e.g., based on resource management procedures for storage). Changing the maximum number of I/O buffers 112 implies changing some of the thresholds below, but is not central to this discussion.

During initialization, three threshold values are set. The first is a choice for an initial value for the round-trip time (RTT) threshold: connections which have longer round-trip times will not be allowed to keep the I/O buffer 112 as a retransmission vehicle. This initial value can be set based on measurements.

The second value is the critical threshold: when the number of I/O buffers 112 that can still be allocated within the maximum buffer limit is at this threshold or lower (the critical zone), new requests to keep the I/O buffer 112 will be rejected (so that the user data must be copied to a system-managed send buffer 124). In fact, while in the critical zone and for a certain critical stabilization interval thereafter, requests to keep the I/O buffer 112 will be rejected when the number of buffers 112 allocated is at or above the tight buffer threshold described next. The critical threshold can be a small constant or can be related to the number of CPUs on the machine; the objective is to prevent use of all possible buffers 112. To simplify the discussion it will be treated as constant since it does not change based on workload conditions. A critical stabilization interval extends for a period of time (reasonable durations would be dozens of seconds to minutes) from any point where any of the last few buffers 112 are allocated.

The third threshold value, the tight buffer threshold, relates to how many in-use I/O buffers 112 can exist before the first threshold for round-trip time is lowered. The initial tight buffer threshold can be set as a percentage of the maximum buffer limit and this initial value represents the maximal value that the tight buffer threshold is allowed to attain for a given maximum buffer limit. As described above, during a critical stabilization interval, buffers 112 may not be kept when the number in use is at or above the tight buffer threshold. This is more restrictive than the normal condition where buffers may be kept at or above the tight buffer threshold up to the critical point.

It is undesirable to use constant values for the entire life of the system, since constant values cannot be optimal for all workloads and environments. It is preferable to allow as many I/O buffers 112 to be used as retransmission vehicles as possible, short of causing outright depletion of the I/O buffer pool wherein new requests to send data must be deferred.

To accomplish this, the present invention allows the round-trip threshold time to rise (how this is done is described in detail later), though this is bounded by some chosen maximum value so that I/O buffers 112 are not tied up for arbitrarily long durations. Increasing this threshold generally allows more requests to keep the I/O buffer 112. At some point too many I/O buffers 112 may be tied up and either the tight buffer threshold, or worse, the critical threshold may be hit. The procedure makes adjustments at two points:

1. during buffer allocation—when controls may be tightened to make keeping the I/O buffer 112 less likely or to be shut down altogether.
2. during a timer driven routine—when controls may be loosened to make keeping the I/O buffer 112 more likely.

If the number of I/O buffers 112 allocated reaches or exceeds the tight buffer threshold, then the round-trip threshold is decreased provided it hasn't been decreased within a tight adjustment interval (an interval measured in seconds). Thus the round-trip threshold is only decreased once during the tight adjustment interval. The purpose of the tight adjustment interval is to prevent overreacting and accommodates the fact that existing buffers 112 will be in use for a short time before they can be freed, so that it would be normal for multiple requests to arrive before the number of in-use buffers 112 decreases below the tight buffer threshold. It is the purpose of the critical threshold to prevent running out of buffers 112 altogether. The amount of decrease of the round-trip threshold can be a (significant) percentage of its current value. There is a minimal value below which the round-trip threshold will not go to prevent the value from dropping to 0. Decreasing the round-trip threshold will make it more difficult to qualify to keep the I/O buffer 112.

Under the assumption that no critical stabilization interval is outstanding, when the I/O buffer 112 is allocated which leaves the critical threshold number of I/O buffers 112 remaining, the tight buffer threshold is decremented and a critical stabilization interval is established. During the critical stabilization interval, each time an I/O buffer 112 is created which increases the high-water mark 164 of buffers 112 created during the interval, the tight buffer threshold is decremented. This decrement does not occur when no buffer 112 can be created or the tight buffer threshold reaches 0. Each additional buffer 112 created in this state reflects that the tight buffer threshold was too high. This limits the number of times that the tight buffer threshold can be decremented within the critical stabilization interval to the critical threshold +1. The critical stabilization interval expires when the number of buffers 112 in use has been outside the critical zone for the complete interval.

As described earlier, during a critical stabilization interval, no requests will be allowed to keep the I/O buffer 112 when the number in use is at or above the tight buffer threshold, so that I/O buffers 112 are only kept from the time data is copied into it until the I/O interrupt signals that the data has been sent (this occurs "long" before the acknowledgment signal arrives). During a critical stabilization interval, when the number of I/O buffers 112 is at or above the tight threshold, I/O buffers 112 can only increase if the inter-arrival time of new requests is less than the time for the I/O subsystem to complete the channel program to send the data. Requests to keep the I/O buffer 112 will be accepted during the critical stabilization interval only when the number of I/O buffers 112 in use is below the tight buffer threshold. When the critical stabilization interval expires, this represents a timeframe over which the number of I/O buffers 112 remaining to be allocated/created was always greater than the critical threshold, and so the procedure now allows I/O buffers 112 to be kept until the critical threshold triggers, rather than the more restrictive tight buffer threshold level.

The mechanism to allow the round trip threshold to rise is based on periodically assessing the utilization of I/O buffers 112. This should be on a somewhat leisurely basis, e.g. a timeframe measured in minutes (one or more), to decrease system overhead and ensure that resource utilization has stabilized from prior adjustments. This timed procedure works as follows: When a tight adjustment interval has only recently expired, no action is taken in order to see if the workload has stabilized with the new round-trip time threshold.

When a tight adjustment interval has expired sufficiently long ago, the existence of the tight adjustment interval is reset. If the critical stabilization interval is still outstanding, then no other action is taken. If it is a tight condition with no critical stabilization interval outstanding, then it falls into one of the following cases:

1. If the tight buffer threshold is at its maximal value, then the round-trip threshold is raised to a value slightly below the level it was at when the tight condition arose. The objective is to find the largest round-trip threshold (within its maximal allowed value) which will not provoke a tight condition. See the graph of FIG. 7 at time 4.
2. If the tight buffer threshold is below its maximal value (so a critical condition occurred sometime in the past), then the tight buffer threshold is incremented and the round-trip threshold is raised to a value midway between its current value and the value it had when the tight condition lowered it. The tight buffer threshold is raised since it may now be too low and did not lead to a critical condition at its current value. The round-trip threshold is also raised (but not as aggressively as in the first case) to permit more requests to keep I/O buffers 112.

Assuming that no tight adjustment interval is outstanding, the procedure looks to see if the number of I/O buffers 112 in use is at or below a low utilization threshold. This threshold has a value below the maximum tight buffer threshold and is chosen as a percentage of the maximum number of buffers 112 allowed. When the number of I/O buffers 112 in use exceeds the low utilization threshold, then no action is taken as buffer utilization is adequate. Otherwise, the round-trip time threshold is restored to a value slightly lower than the value it had when a tight condition lowered it (if no tight condition has ever occurred, then the value is raised this same amount from its current value), provided this would not exceed the maximal allowed value.

Having described the invention in general terms, a specific implementation in the configuration shown in FIG. 1 will now be described.

In the specific implementation, the following control information is maintained on a systemwide basis:

- 150 Critical buffer threshold
- 152 Tight buffer threshold
- 154 RTT threshold to keep buffers 112
- 156 Maximum RTT threshold value
- 158 Byte threshold to keep buffers 112
- 160 Maximum allowed buffer count
- 162 Allocated buffer count. This is the number of VO buffers 112 currently allocated
- 164 High-water mark for allocated buffers 112
- 166 Tight interval endpoint
- 168 Low utilization buffer threshold
- 170 Critical shortage condition
- 172 Critical shortage condition relieved
- 174 Critical stabilization interval endpoint
- 176 Critical high-water mark for allocated buffers 112

Figure 2A:
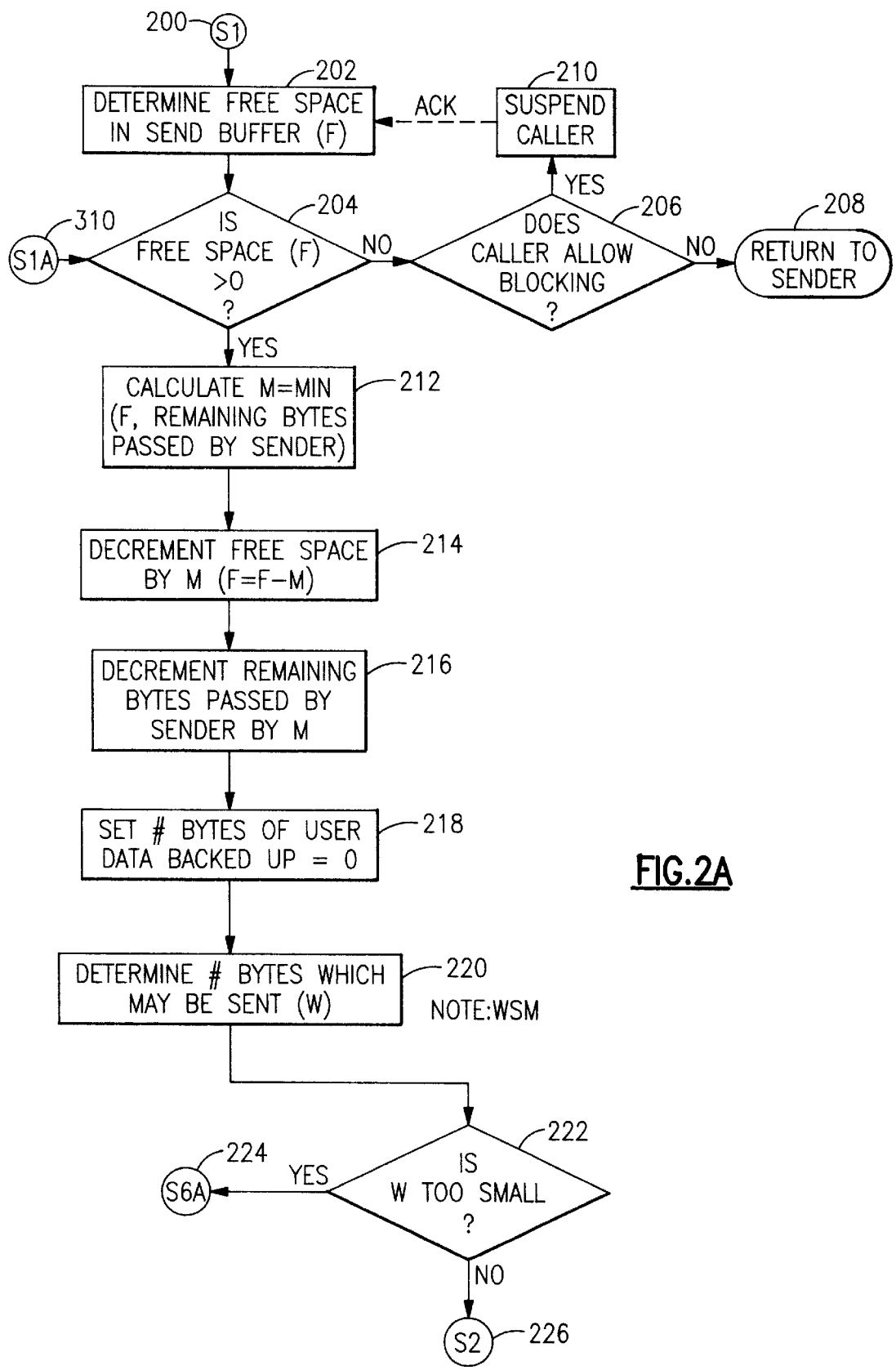
FIGS. 2A–2F shows the routine for processing a send request.

The following control information is maintained on a connection basis:

- 178 Send buffer size
- 180 Free space in send buffer 124
- 182 I/O burst size
- 184 Sender round-trip time (RTT)
- 186 Window size
- 188 List of I/O buffer tokens and/or send buffer ranges associated with user data The following control information is maintained on a per I/O buffer 112 basis:

- 190 Retransmit use count. This is used to indicate the number of requesters 118 or 120 holding data in the buffer 112 for possible retransmission. When the use count is zero, the buffer 112 can be freed.
- 192 Free space information FIGS. 2A–2F show the processing by communication stack 110 of a send request from a sender 118 or 120. Referring first to FIG. 2A, upon being invoked at S1 (step 200), the routine looks at the free space information 180 to determine the free space F in the send buffer 124 (step 202). If there is no free space, the routine determines whether the caller allows blocking (step 206). If so, the routine suspends the caller (210) and returns to step 202 when an appropriate acknowledgment arrives; otherwise, the routine returns to the sender (step 208).

If at step 202 there is free space, the routine sets the value M equal to the minimum of the free space F and the remaining bytes passed by the sender (step 212). The routine then decrements the free space F by M (step 214), decrements the remaining bytes passed by the sender by M (step 216), and sets the number of bytes of user data 122 backed up equal to zero (step (218). The routine then determines the number of bytes W that may be sent, where W≦M (step 220). If W is too small (step 222), the routine jumps to point S6A (step 224); otherwise, the routine advances to point S2 (step 226).

Figure 2B:
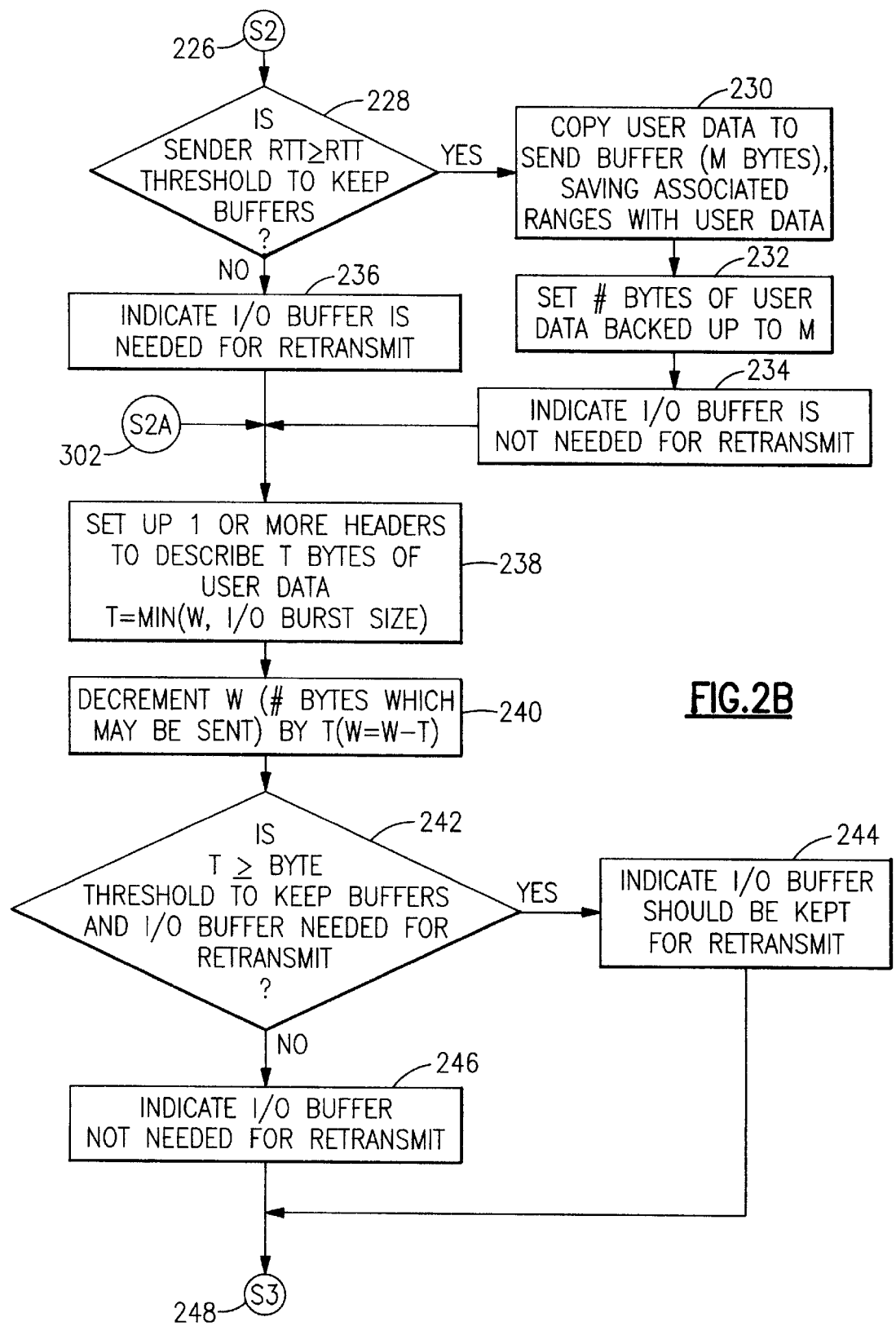

Referring now to FIG. 2B, after reaching point S2 at step 226, the routine determines whether the sender RTT exceeds the RTT threshold 154 to keep the buffer (step 228). If so, the routine copies M bytes of user data 122 to the send buffer 124, saving the send buffer ranges associated with user data 188 (step 230), sets the number of bytes of user data 122 backed up equal to M (step 232), and indicates that the I/O buffer 112 is not needed for retransmitting (step 234). Otherwise, the routine indicates that the I/O buffer 112 is needed for retransmitting (step 236).

After performing steps 230–234 or step 236, depending on the result of the comparison at step 228, the routine sets up one or more headers to describe T bytes of user data 122, where T is the minimum of W and the I/O burst size 182 (step 238), and decrements W by T (step 240).

The routine then determines whether T is at least the byte threshold 158 to keep the buffers and the I/O buffer 112 needed to retransmit (step 242). If so, the routine indicates that the I/O buffer 112 should be kept for retransmitting (step 244) and advances to point S3 (step 248). Otherwise, the routine indicates that the I/O buffer 112 is not needed for retransmitting (step 246) and advances to point S3.

Figure 2C:
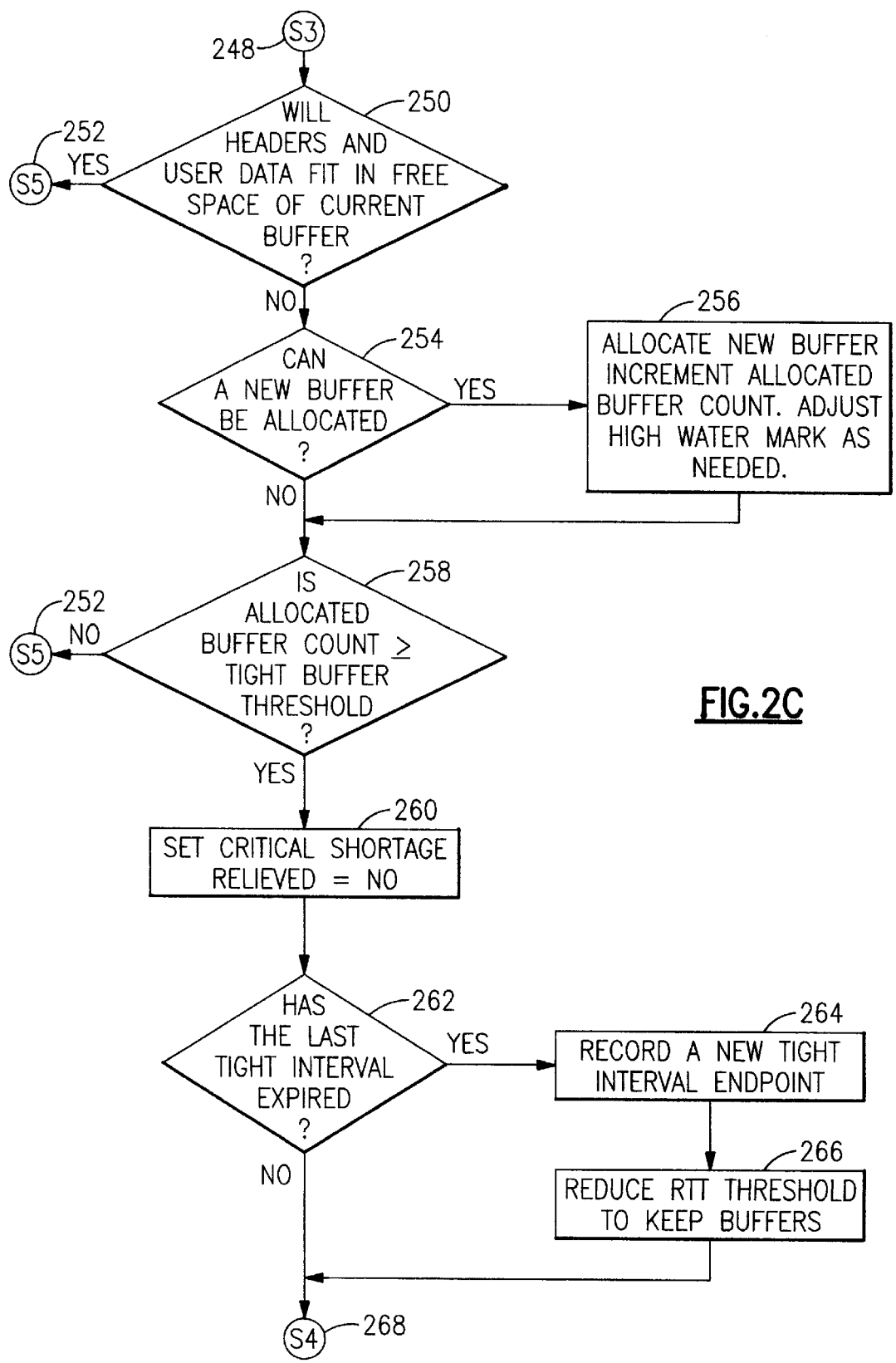

Referring now to FIG. 2C, after reaching point S3 from either step 244 or step 246, the routine determines whether the headers and user data 122 will fit in the free space of the current buffer (step 250). If so, the routine jumps to point S5 (step 252). Otherwise, the routine determines whether a new buffer can be allocated (step 254). If it can, then the routine allocates a new buffer, increments the allocated buffer count 162, and adjusts the high-water mark 164 as needed (step 256) before advancing to step 258. If a new buffer cannot be allocated, the routine advances directly to step 258 without performing step 256.

At step 258, the routine determines whether the allocated buffer count 162 is at least equal to the tight buffer threshold 152. If not, the routine jumps to point S5 (step 252). Otherwise, the routine sets the critical shortage relieved flag 172 equal to NO (step 260) and determines whether the last tight interval has expired (step 262). If it has, then the routine records a new tight interval endpoint 166 (step 264) and reduces the RTT threshold 154 to keep buffers (step 266) before advancing to point S4 (step 268). Otherwise, the routine advances directly to point S4 without performing steps 264–266.

Figure 2D:
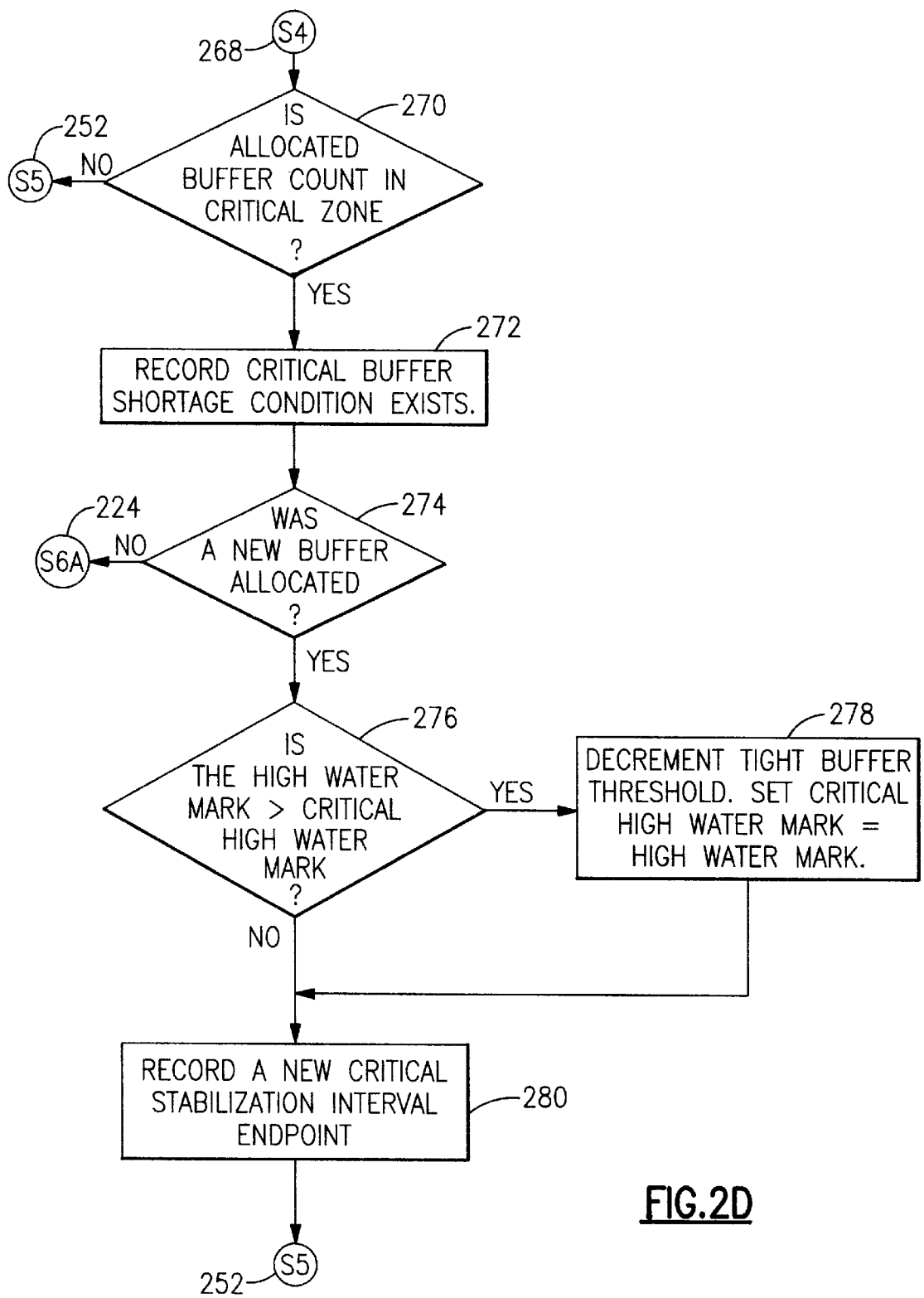

Referring now to FIG. 2D, after reaching point S4, the routine determines whether the allocated buffer count 162 is in the critical zone (step 270). If it is, then the routine jumps to point S5 (step 252). If it is not, the routine sets flag 170 to record that a critical buffer shortage condition exists (step 272) and determines whether a new buffer was allocated (step 274). If it was not, the routine jumps to point S6A (step 224). If it was, the routine determines whether the high-water mark 164 is greater than the critical high-water mark 176 (step 276). If it is, then the routine decrements the tight buffer threshold 152 and sets the critical high-water mark 176 equal to the current high-water mark 164 (step 278), records a new critical stabilization interval endpoint 174 (step 280) and advances to point S5 (step 252). Otherwise, the routine performs step 280 and advances to point S5 without performing step 278.

Figure 2E:
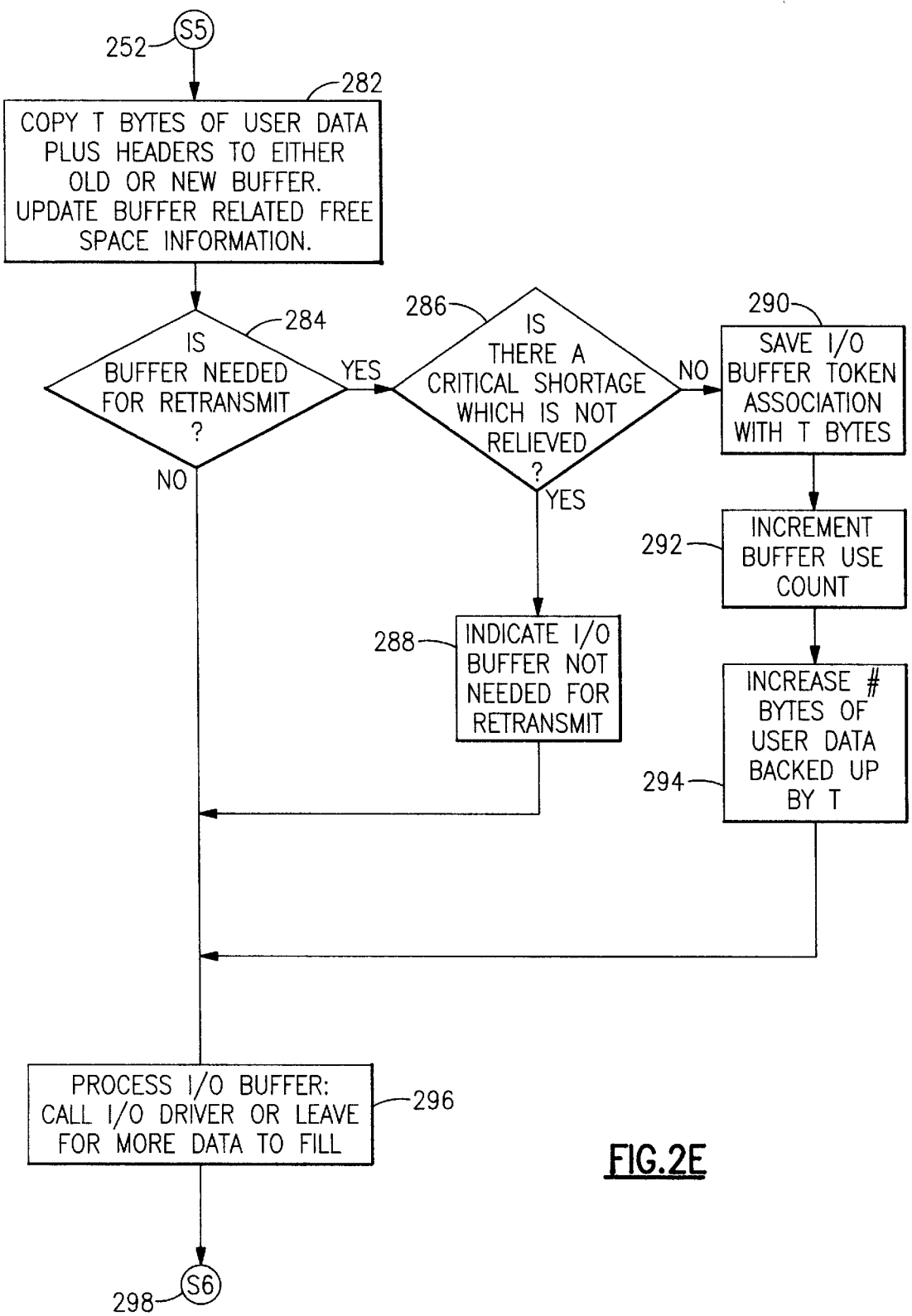

Referring now to FIG. 2E, after reaching point S5, the routine copies T bytes of user data 122 plus headers to either the old or new buffer and updates the buffer-related free space information 192 (step 282). The routine then determines whether the buffer is needed for retransmitting (step 284). If it is not, the routine proceeds directly to step 296. If the buffer is needed for retransmitting, the routine checks flags 170 and 172 to determine whether there is a critical shortage which is not relieved (step 286). If there is, the routine indicates that the I/O buffer 112 is not needed for retransmitting (step 288) and proceeds to step 296. If there is no critical shortage or the critical shortage has been relieved, then the routine saves the I/O buffer token association with T bytes (step 290), increments the buffer use count 190 (step 292), and increases the number of bytes of user data 122 backed up by T (step 294) before proceeding to step 296. At step 296, the routine processes the I/O buffer 112 by calling the I/O driver or leaving the buffer 112 for more data to fill (see the related application referred to above) and then proceeds to point S6 (step 298).

Figure 2F:
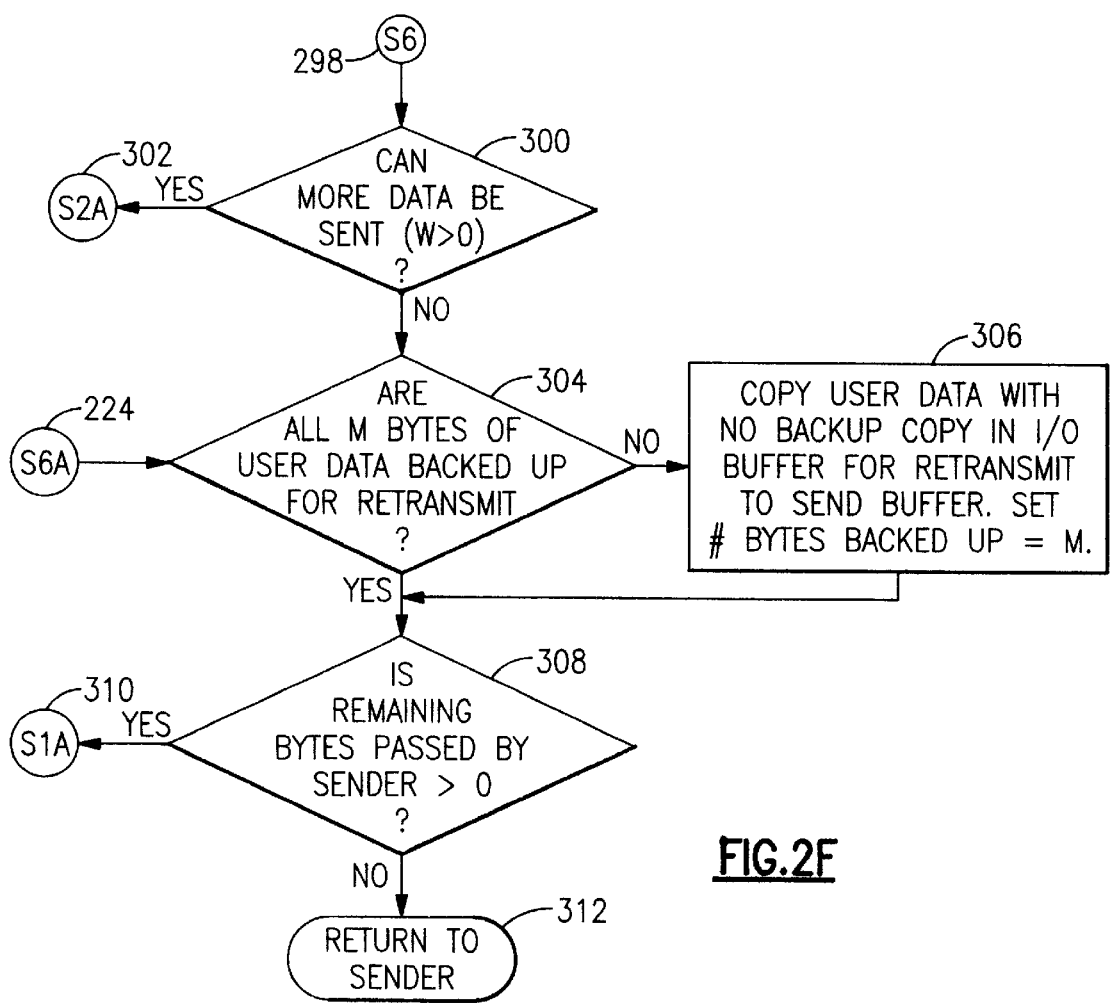

Referring now to FIG. 2F, after reaching point S6, the routine determines whether more data can be sent (i.e. whether W>0) (step 300). If it can, then the routine jumps to point S2A (step 302). Otherwise, or after jumping to point S6A (step 224), the routine determines whether all M bytes of user data 122 are backed up for retransmitting (step 304). If they are not backed up, then the routine copies the user data 122 with no backup copy in the I/O buffer 112 for retransmitting to the send buffer 124 and sets the number of bytes backed up equal to M (step 306). Thereafter, or if the data is backed up at step 304, the routine determines whether there are any remaining bytes passed by the sender (step 308). If there are, the routine jumps to point S1A (step 310). If there are no remaining bytes, the routine returns to the sender (step 312).

Figure 3:
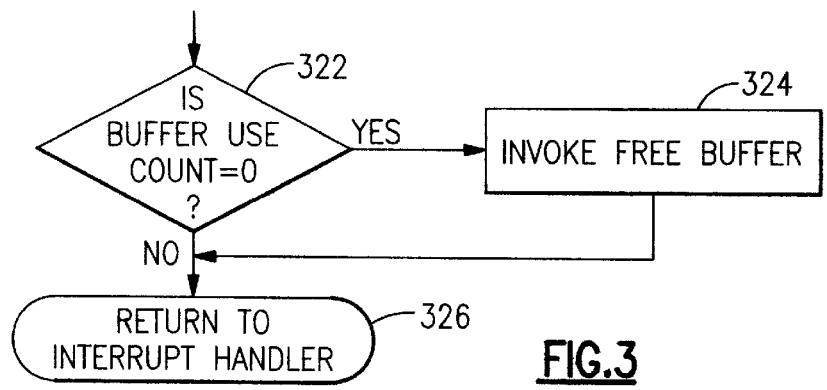
FIG. 3 shows the routine for outbound interrupt processing.

FIG. 3 shows the outbound interrupt processing routine 300. Upon the occurrence of an interrupt, the routine 300 determines whether the buffer use count 190 is zero, i.e., whether there are any retransmission dependencies to keep the buffer (step 322). If the count is zero, the routine invokes the free buffer routine 400 of FIG. 4 before returning to the interrupt handler (step 326). If the buffer use count 190 is not zero, then the routine 400 returns to the interrupt handler without performing step 324.

Figure 4:
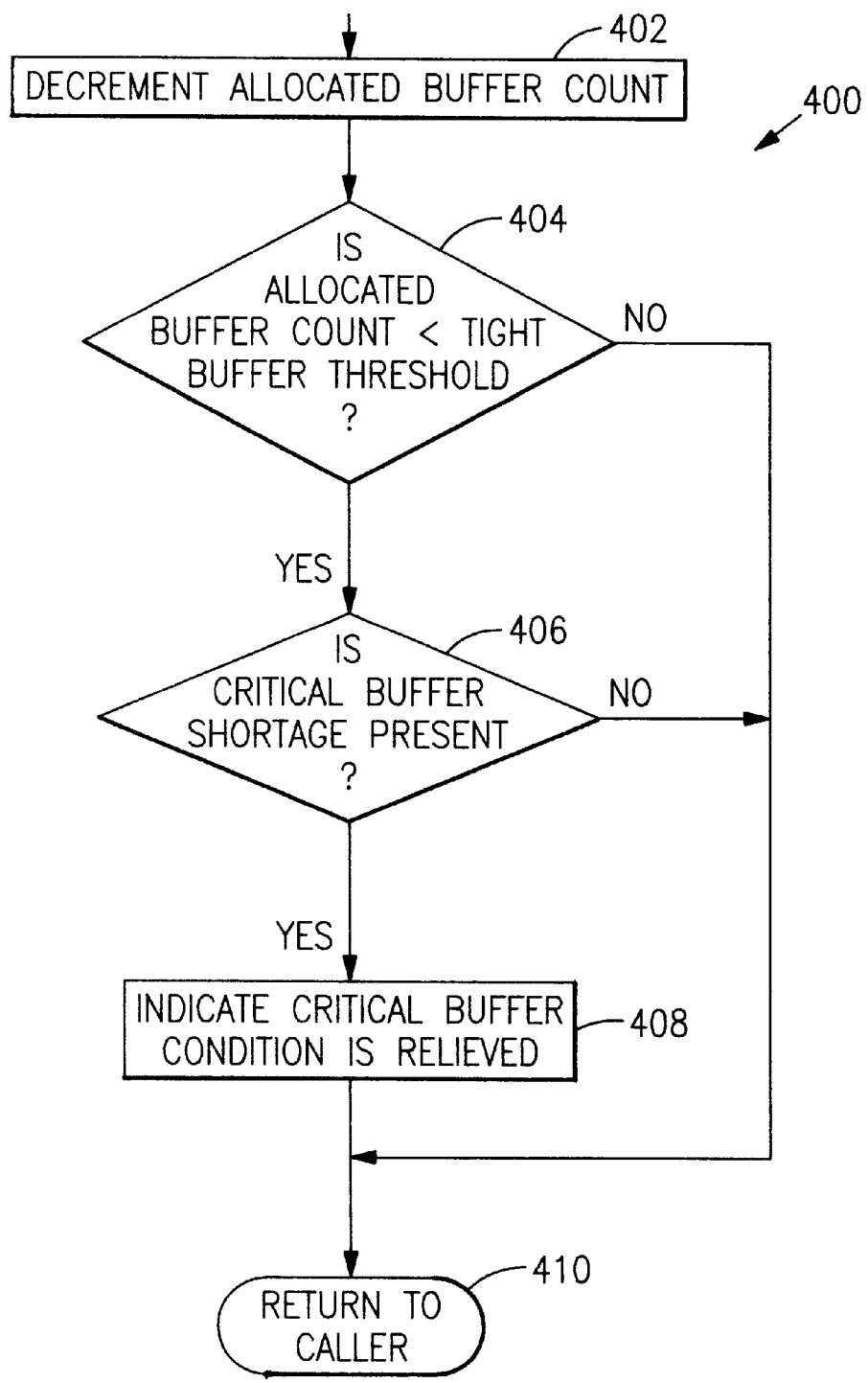
FIG. 4 shows the free buffer processing routine.

FIG. 4 shows the free buffer routine 400, which is invoked at step 324 described above and also at step 518 of the acknowledgment processing routine 500 (FIGS. 5A–5B) to be described. Upon being invoked, the routine 400 decrements the allocated buffer count 162 (step 402) and determines whether the count is now below the tight buffer threshold 152 (step 404). If it is not, the routine 400 returns to the caller (i.e., routine 500) (step 410). If the count 162 is now below the tight buffer threshold 152, the routine 400 checks flag 170 to determine whether there is a critical buffer shortage (step 412). If there is not, then the routine returns to the caller (step 410). If there is a critical buffer shortage, the routine indicates that the critical buffer condition is relieved by setting flag 172 (step 408) before returning to the caller at step 410.

Figure 5A:
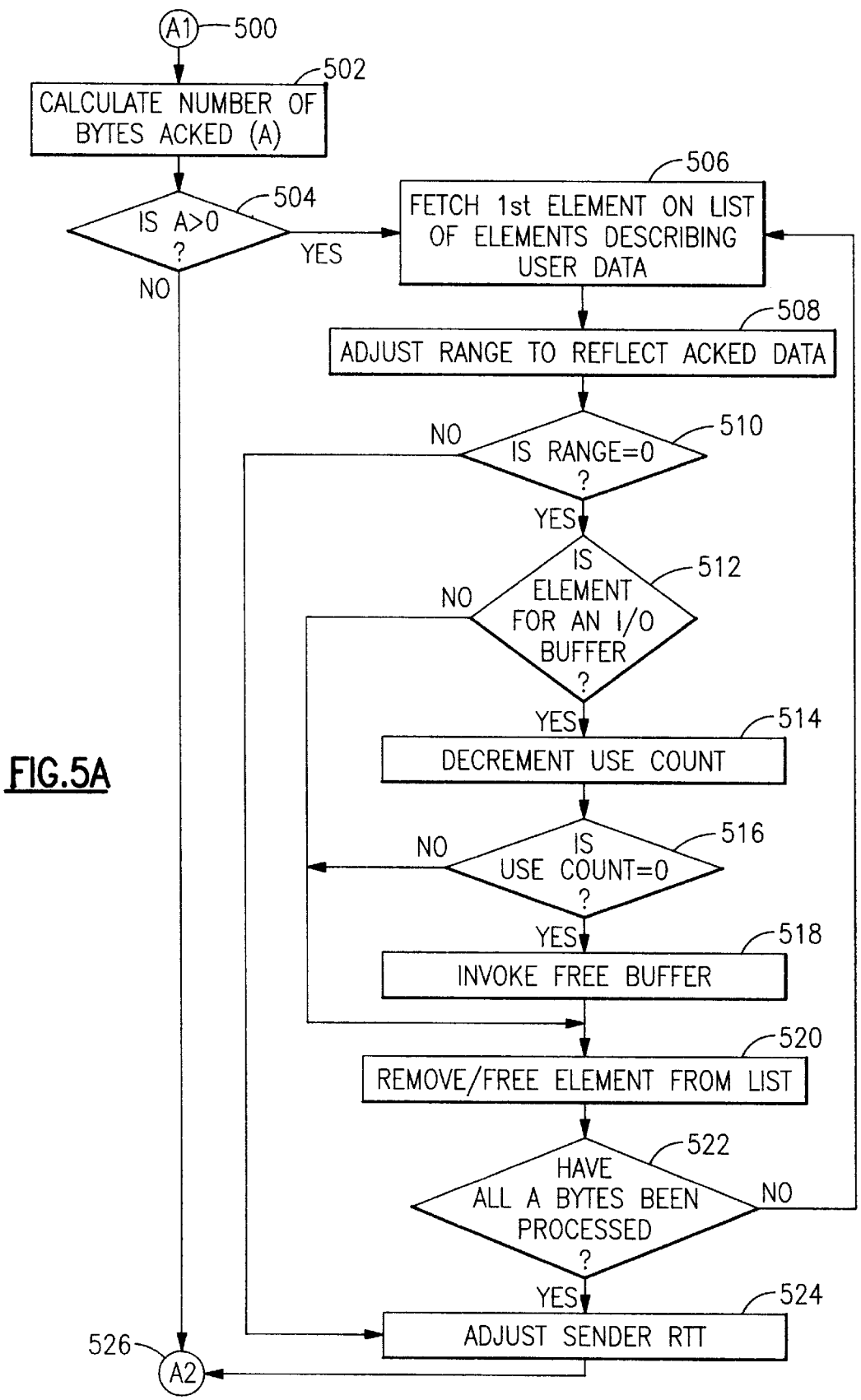
FIGS. 5A–5B show the acknowledgment processing routine.
Figure 5B:
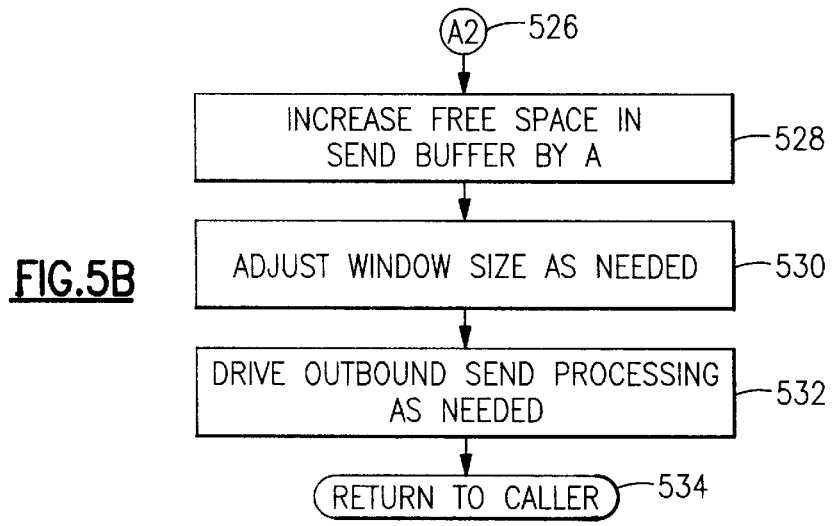

FIGS. 5A–5B show the routine 500 for processing an inbound acknowledgment (ACK). Upon being invoked at point A1, the routine 500 calculates the number of bytes A acknowledged (step 502). If A is zero (step 504), then the routine 500 proceeds directly to point A2 (step 526). Otherwise (i.e., if A>0), the routine 500 fetches the first element on the list of elements describing user data 122 (step 506) and adjusts the range to reflect the acknowledged data (step 508). If the remaining range is nonzero (step 510), the routine 500 adjusts the sender RTT (step 524) and proceeds to point A2 (step 526). Otherwise (i.e., the range is zero), the routine 500 determines whether the element is for an I/O buffer 112 (step 512). If not, the routine 500 proceeds to step 520. Otherwise, the routine 500 decrements the use count 190 (step 514) and determines whether the use count 190 is now zero (step 516). If the use count is nonzero, the routine proceeds to step 520. If the use count 190 is now zero, then the routine invokes the free buffer routine 400 of FIG. 4 (step 518) before proceeding to step 520.

At step 520, the routine 500 removes the element from the list. If all A bytes have been processed (step 522), the routine adjusts the sender RTT (step 524) and advances to point A2 (step 526). Otherwise, the routine 500 loops back to step 506.

After reaching point A2 (step 526), the routine 500 increases the free space in the send buffer 124 by A (step 528), adjusts the window size as needed (step 530), drives the outbound send processing as needed (see step 210 in FIG. 2A) (step 532), and returns to the caller (step 534).

Figure 6B:
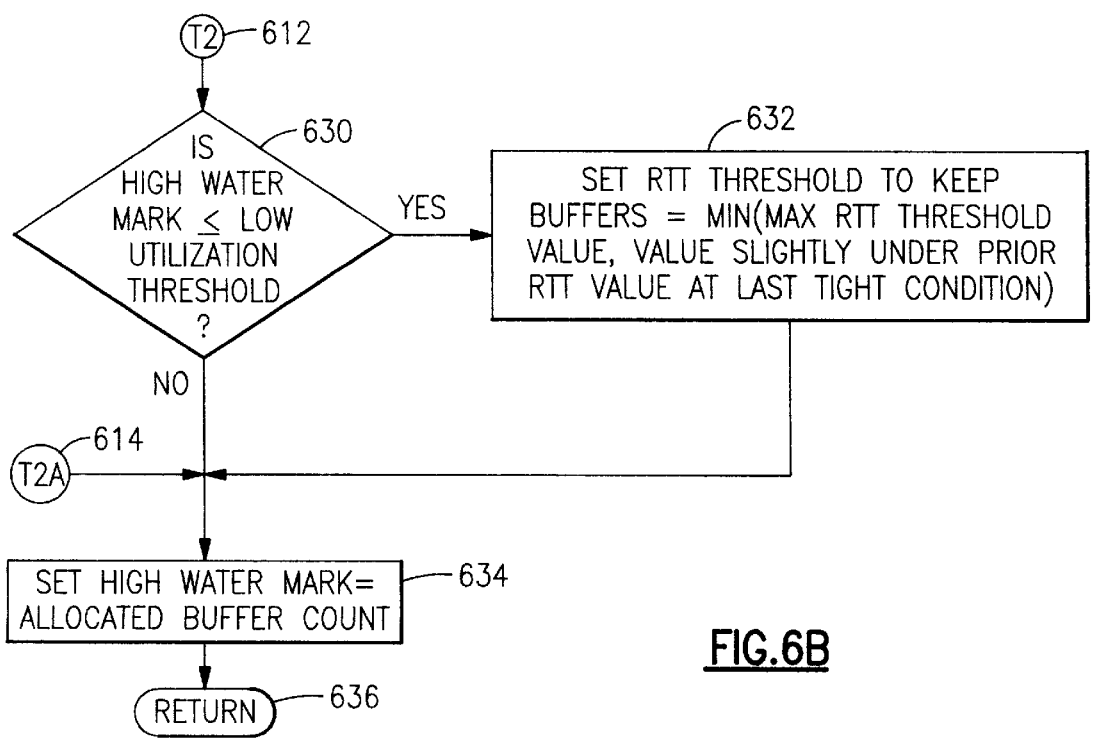
FIGS. 6A–6B show the timer-driven routine.
Figure 6A:
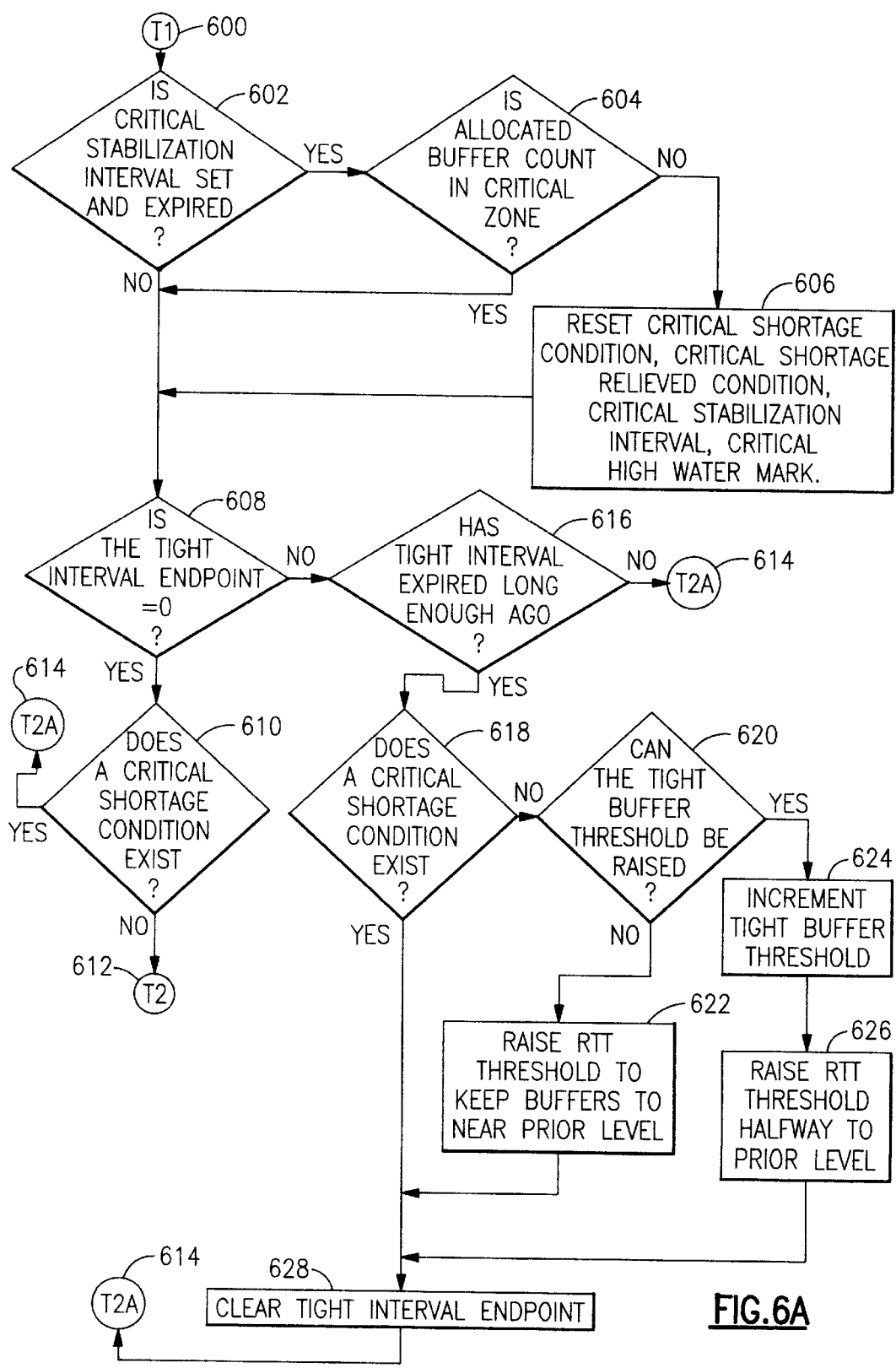

FIGS. 6A–6B show the timer-driven routine, which begins at point T1 (step 600). The routine first determines whether a critical stabilization interval 174 has been set and has expired (step 602). If not, the routine proceeds directly to step 608. If it has expired, then the routine determines whether the allocated buffer count 162 is in the critical zone (step 604). If it is, the routine advances to step 608. Otherwise, the routine resets the critical shortage condition flag 170, the critical shortage relieved condition flag 172, the critical stabilization interval 174 and the critical high-water mark 176 (step 606) before proceeding to step 608.

At step 608, the routine determines whether the tight interval endpoint 166 is zero. If it is, then the routine determines whether a critical shortage condition 170 exists (step 610). If it does not, then the routine jumps to point T2 (step 612). Otherwise, it jumps to point T2A (step 614).

If at step 608 the tight interval endpoint 166 is at zero, then the routine determines whether the tight interval expired long enough ago (step 616). If it did not, the routine jumps to point T2A (step 614). Otherwise, the routine determines whether a critical shortage condition 170 exists (step 618). If it does exist, then the routine clears the tight interval endpoint 166 (step 628) and advances to point T2A (step 614). If a critical shortage condition 170 does not exist, then the routine determines whether the tight buffer threshold 152 can be raised (step 620). If it cannot, the routine raises the RTT threshold 154 to keep buffers to near their prior level (step 622) and advances to step 628. If the tight buffer threshold 152 can be raised, then the routine increments the tight buffer threshold 152 (step 624) and raises the RTT threshold 154 halfway to its prior level (step 626) before proceeding to step 628.

Referring now to FIG. 6B, after reaching point T2 (step 612), the routine determines whether the high-water mark 164 is at or below the low utilization threshold 168 (step 616). If it is, then the routine sets the RTT threshold 154 to keep the buffers equal to the minimum of the maximum RTT threshold value 156 and a value slightly under the prior RTT value at the last tight condition, sets the high-water mark equal 164 to the allocated buffer count 162 (step 620), and returns (step 622). If the high-water mark 164 is above the low utilization threshold 168, then the routine proceeds directly to step 634 without performing step 632. The routine also performs step 634 (without performing steps 630–632) after reaching point T2A (step 614).

The graph of FIG. 7 shows a possible "worse case" scenario where a surge in demand causes the following events. Note that the round-trip time threshold is not plotted, since this would require another dimension, but changes in its value are marked. Actions taken by the timed procedure occur at times marked by integers. The scenario contains the following successive events:

1. a tight event which was successfully resolved
2. increasing workload
3. succession of tight events which lead to a critical event
4. increasing workload
5. succession of tight events which lead to a critical event and all buffers utilized Note that once all buffers are utilized, the tight buffer threshold 152 will not be lowered further until the critical stabilization interval 174 expires.

Also, note that it is possible to have multiple distinct tight events between two timer instances, i.e. where a buffer is allocated above the tight mark and separated by enough time to be treated as distinct events, in which case the round-trip time is lowered each time.

Actions taken by the timed procedure occur at times marked by integers:

1. Raise round-trip time threshold 154 since buffers are below low utilization threshold 168
2. No action—no tight conditions, buffer utilization OK
3. No action—very recent tight condition
4. Raise round-trip time threshold 154 to level slightly below that in use between times 2.9 and 3.1. Tight adjustment interval 166 is reset. (see case under tight condition with no critical stabilization interval outstanding).
5. No action—very recent tight condition
6. No action beyond resetting tight adjustment interval 166 as critical stabilization interval 174 is unexpired.
7. No action—no tight adjustment interval, buffer utilization OK.
8. No action beyond resetting tight adjustment interval as critical stabilization interval is unexpired.

The invention is preferably implemented as software (i.e., a machine-readable program of instructions tangibly embodied on a program storage device) executing on a hardware machine. While a particular embodiment has been shown and described, it will be apparent to those skilled in the art that various modifications may be made without departing from the spirit of the invention.

What is claimed is:

1. In an information handling system in which data transmitted to a remote receiver is held for retransmission in the event of a transmission error, the system having an input/output (I/O) buffer, a method of selectively using the I/O buffer as a retransmission vehicle for retransmitting the data in the event of a transmission error, the method comprising the steps of:

determining whether the I/O buffer should be used as a retransmission vehicle for transmitted data;

if it is determined that the I/O buffer should be used as a retransmission vehicle for the transmitted data, holding the data in the I/O buffer for retransmission to the receiver until an acknowledgment is returned by the receiver; and if it is determined that the I/O buffer should not be used as a retransmission vehicle for the transmitted data, holding the data in a buffer other than the I/O buffer for retransmission to the receiver until an acknowledgment is returned by the receiver.

2. The method of claim 1 in which the transmitted data has an expected round-trip time for the return of an acknowledgment from the receiver and is held in a buffer other than the I/O buffer if the expected round-trip time exceeds a predetermined round-trip time threshold.

3. The method of claim 2, comprising the further step of: dynamically adjusting the round-trip time threshold.

4. The method of claim 1 in which a predetermined remaining number of I/O buffers may be allocated, the transmitted data being held in a buffer other than the I/O buffer if the remaining number of I/O buffers falls below a predetermined critical threshold.

5. The method of claim 4, comprising the further step of:

starting a critical stabilization interval if the remaining number of I/O buffers falls below the critical threshold, the transmitted data being held in a buffer other than the I/O buffer if the number of I/O buffers already in use exceeds a predetermined tight buffer threshold during a critical stabilization interval.

6. The method of claim 1, comprising the further step of:

maintaining a count of the number of items of data in an I/O buffer awaiting acknowledgment.

7. The method of claim 6, comprising the further step of:

decrementing the count upon receiving an acknowledgment for an item of data in the I/O buffer.

8. The method of claim 7, comprising the further step of:

freeing the I/O buffer when the count has been decremented to zero.

9. In an information handling system in which data transmitted to a remote receiver is held in a buffer for retransmission in the event of a transmission error, the system having an input/output (I/O) buffer, apparatus for selectively using the I/O buffer as a retransmission vehicle for retransmitting the data in the event of a transmission error, comprising:

means for determining whether the I/O buffer should be used as a retransmission vehicle for transmitted data;

means for holding the data in the I/O buffer for retransmission to the receiver until an acknowledgment is returned by the receiver if it is determined that the I/O buffer should be used as a retransmission vehicle for the transmitted data; and means for holding the data in a buffer other than the I/O buffer for retransmission to the receiver until an acknowledgment is returned by the receiver if it is determined that the I/O buffer should not be used as a retransmission vehicle for the transmitted data.

10. The apparatus of claim 9 in which the transmitted data has an expected round-trip time for the return of an acknowledgment from the receiver and is held in a buffer other than the I/O buffer if the expected round-trip time exceeds a predetermined round-trip time threshold.

11. The apparatus of claim 10, further comprising:

means for dynamically adjusting the round-trip time threshold.

12. The apparatus of claim 10 in which a predetermined remaining number of I/O buffers may be allocated, the transmitted data being held in a buffer other than the I/O buffer if the remaining number of I/O buffers falls below a predetermined critical threshold.

13. The apparatus of claim 12, further comprising:

means for starting a critical stabilization interval if the remaining number of I/O buffers falls below the critical threshold, the transmitted data being held in a buffer other than the I/O buffer if the number of I/O buffers already in use exceeds a predetermined tight buffer threshold during a critical stabilization interval.

14. The apparatus of claim 9, further comprising:

means for maintaining a count of the number of items of data in an I/O buffer awaiting acknowledgment.

15. The apparatus of claim 14, further comprising:

means for decrementing the count upon receiving an acknowledgment for an item of data in the I/O buffer.

16. A program storage device readable by a machine, tangibly embodying a program of instructions executable by the machine to perform method steps for selectively using an I/O buffer as a retransmission vehicle for retransmitting data in the event of a transmission error in an information handling system in which data transmitted to a remote receiver is held in a buffer for retransmission in the event of a transmission error, the method steps comprising:

determining whether the I/O buffer should be used as a retransmission vehicle for transmitted data;

if it is determined that the I/O buffer should be used as a retransmission vehicle for the transmitted data, holding the data in the I/O buffer for retransmission to the receiver until an acknowledgment is returned by the receiver; and if it is determined that the I/O buffer should not be used as a retransmission vehicle for the transmitted data, holding the data in a buffer other than the I/O buffer for retransmission to the receiver until an acknowledgment is returned by the receiver.

17. The apparatus of claim 16, further comprising:

means for freeing the I/O buffer when the count has been decremented to zero.

18. The program storage device of claim 17 in which the transmitted data has an expected round-trip time for the return of an acknowledgment from the receiver and is held in a buffer other than the I/O buffer if the expected round-trip time exceeds a predetermined round-trip time threshold.

19. The program storage device of claim 17 in which a predetermined remaining number of I/O buffers may be allocated, the transmitted data being held in a buffer other than the I/O buffer if the remaining number of I/O buffers falls below a predetermined critical threshold.

20. The program storage device of claim 19, comprising the further step of:

starting a critical stabilization interval if the remaining number of I/O buffers falls below the critical threshold, the transmitted data being held in a buffer other than the I/O buffer if the number of I/O buffers already in use exceeds a predetermined tight buffer threshold during a critical stabilization interval.

* * * * *